(12) United States Patent
Zhao et al.

(10) Patent No.: US 10,613,058 B2
(45) Date of Patent: Apr. 7, 2020

(54) CMUT SIGNAL SEPARATION WITH MULTI-LEVEL BIAS CONTROL

(71) Applicant: KOLO MEDICAL, LTD., San Jose, CA (US)

(72) Inventors: Danhua Zhao, San Jose, CA (US); Constantine Simopoulos, San Francisco, CA (US)

(73) Assignee: Kolo Medical, Ltd., San Jose, CA (US)

( * ) Notice: Subject to any disclaimer, the term of this patent is extended or adjusted under 35 U.S.C. 154(b) by 252 days.

(21) Appl. No.: 15/633,885

(22) Filed: Jun. 27, 2017

(65) Prior Publication Data

US 2018/0372691 A1 Dec. 27, 2018

(51) Int. Cl.
  *G01N 29/24* (2006.01)
  *G01N 29/26* (2006.01)

(52) U.S. Cl.
  CPC ....... *G01N 29/2406* (2013.01); *G01N 29/262* (2013.01); *G01N 2291/106* (2013.01)

(58) Field of Classification Search
  CPC ............. G01N 29/2406; G01N 29/262; G01N 2291/106
  USPC .......................................................... 73/632
  See application file for complete search history.

(56) References Cited

U.S. PATENT DOCUMENTS

| | | | | |
|---|---|---|---|---|
| 5,520,187 A | * | 5/1996 | Snyder ................ | G01S 7/52034 600/447 |
| 6,381,197 B1 | * | 4/2002 | Savord ................. | B06B 1/0292 367/178 |
| 6,499,348 B1 | * | 12/2002 | Mamayek ............. | B06B 1/0292 367/153 |
| 6,795,374 B2 | | 9/2004 | Barnes et al. | |
| 7,564,172 B1 | | 7/2009 | Huang | |
| 7,612,635 B2 | | 11/2009 | Huang | |
| 7,759,839 B2 | | 7/2010 | Huang | |
| 7,764,003 B2 | | 7/2010 | Huang | |
| 7,779,696 B2 | | 8/2010 | Huang | |
| 7,880,565 B2 | | 2/2011 | Huang | |
| 7,956,510 B2 | | 6/2011 | Huang | |
| 8,004,373 B2 | | 8/2011 | Huang | |
| 8,008,105 B2 | | 8/2011 | Huang | |
| 8,018,301 B2 | | 9/2011 | Huang | |
| 8,105,941 B2 | | 1/2012 | Huang | |
| 8,120,229 B2 | | 2/2012 | Huang | |

(Continued)

*Primary Examiner* — Natalie Huls
*Assistant Examiner* — Monica S Young
(74) *Attorney, Agent, or Firm* — Mattingly & Malur, PC

(57) ABSTRACT

In some examples, a capacitive micromachined ultrasonic transducer (CMUT) array may include a plurality of CMUT elements arranged in a plurality of rows, each row including multiple CMUT elements. A bias voltage supply may be connected for supplying bias voltages to a first row, a second row, and a third row of the plurality of rows. In addition, a processor may be configured by executable instructions to control the bias voltages by applying a first bias voltage to the second row, and a second, different bias voltage to the first and third rows to configure the CMUT elements of the second row to at least one of transmit or receive ultrasonic energy with different efficiency than the CMUT elements of the first row and the third row. In some examples, individual contributions from different rows can be computed from different firing sequences for synthetic aperture beamformation in an elevation dimension.

20 Claims, 9 Drawing Sheets

(56) References Cited

U.S. PATENT DOCUMENTS

| | | |
|---|---|---|
| 8,247,945 B2 | 8/2012 | Huang |
| 8,345,513 B2 | 1/2013 | Huang |
| 8,363,514 B2 | 1/2013 | Huang |
| 8,429,808 B2 | 4/2013 | Huang |
| 8,483,014 B2 | 7/2013 | Huang |
| 8,526,271 B2 | 9/2013 | Huang |
| 8,559,274 B2 | 10/2013 | Huang |
| 8,641,628 B2 | 2/2014 | Bradley et al. |
| 8,672,850 B1 * | 3/2014 | Miller ................ G01S 15/8925 600/437 |
| 8,767,514 B2 | 7/2014 | Huang |
| 8,796,901 B2 | 8/2014 | Huang |
| 8,815,653 B2 | 8/2014 | Huang |
| 8,926,517 B2 | 1/2015 | Huang |
| 8,952,595 B2 | 2/2015 | Huang |
| 8,975,984 B2 | 3/2015 | Huang |
| 9,132,450 B2 | 9/2015 | Huang |
| 9,221,077 B2 | 12/2015 | Chen et al. |
| 9,408,588 B2 | 8/2016 | Huang |
| 2004/0160144 A1 * | 8/2004 | Daft ...................... B06B 1/0292 310/334 |
| 2005/0124884 A1 * | 6/2005 | Bolorforosh ............. A61B 8/12 600/439 |
| 2007/0079658 A1 * | 4/2007 | Wagner ................ B06B 1/0207 73/627 |
| 2007/0242567 A1 * | 10/2007 | Daft ........................ A61B 8/12 367/140 |
| 2008/0027320 A1 * | 1/2008 | Bolorforosh ............. A61B 8/12 600/439 |
| 2009/0079299 A1 * | 3/2009 | Bradley ............. G01S 15/8925 310/322 |
| 2010/0063397 A1 * | 3/2010 | Wagner ................ A61B 8/4483 600/459 |
| 2015/0087991 A1 * | 3/2015 | Chen .................... G01S 7/5202 600/459 |
| 2017/0360399 A1 * | 12/2017 | Rothberg ............. A61B 8/4477 |
| 2018/0164418 A1 * | 6/2018 | Zemp ........................ A61B 8/00 |
| 2018/0246207 A1 * | 8/2018 | Brown ............... G01S 15/8927 |

\* cited by examiner

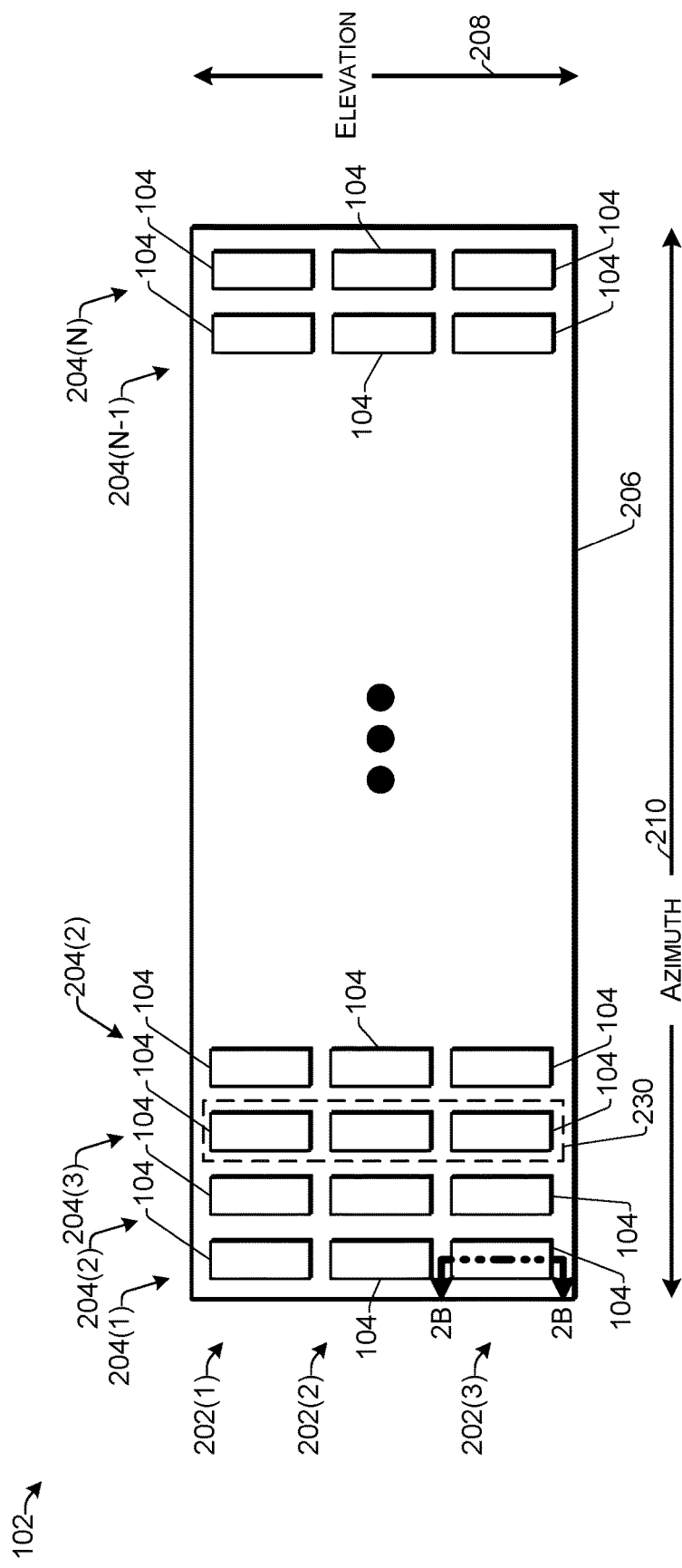
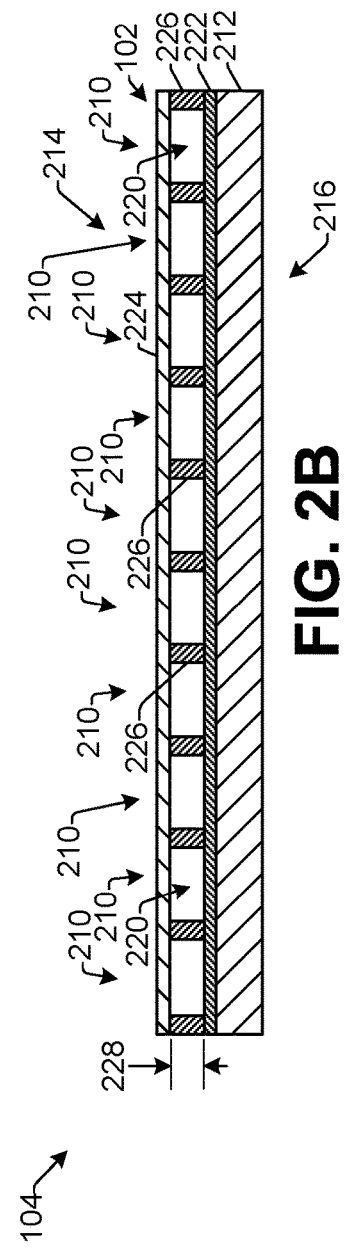
FIG. 2A
FIG. 2B

800

CONFIGURE A CMUT ARRAY WITH A PLURALITY OF CMUT ELEMENTS ARRANGED IN A PLURALITY OF M ROWS AND A PLURALITY OF N COLUMNS, WITH THE ROWS HAVING INDIVIDUALLY CONTROLLABLE BIAS VOLTAGES AND THE COLUMNS BEING CONNECTED TO INDIVIDUALLY CONTROLLABLE TRANSMIT AND/OR RECEIVE CHANNELS
802

CONNECT THE CMUT ARRAY TO AN IMAGING SYSTEM, BIAS VOLTAGE SUPPLY, AND/OR MULTIPLEXER
804

DIRECT THE CMUT ARRAY TOWARD AN OBJECT
806

FOR MULTIPLE ONES OF THE CMUT ELEMENTS, CAUSE AT LEAST SOME OF THE PLURALITY OF CMUT ELEMENTS TO TRANSMIT AND/OR RECEIVE ULTRASONIC ENERGY WHILE APPLYING A FIRST BIAS VOLTAGE TO ONE OF THE ROWS, AND A SECOND, LOWER BIAS VOLTAGE TO AT LEAST ONE OTHER ONE OF THE ROWS
808

PERFORM SIGNAL PROCESSING ON SIGNALS RECEIVED FROM THE ARRAY TO DETERMINE AN ESTIMATED CONTRIBUTION OF INDIVIDUAL ONES OF THE CMUT ELEMENTS BASED ON AN EFFICIENCY MATRIX DETERMINED FROM A PLURALITY OF RECEIVED SIGNALS
810

PRESENT AN IMAGE BASED ON THE RECEIVED ULTRASONIC SIGNALS
812

FIG. 8

CMUT SIGNAL SEPARATION WITH MULTI-LEVEL BIAS CONTROL

TECHNICAL FIELD

Some examples herein relate to capacitive micromachined ultrasonic transducers (CMUTs), such as may be used for ultrasound imaging.

BACKGROUND

Ultrasound transducers are widely used in many different fields, including ultrasound imaging. In many conventional medical imaging applications, ultrasound transducers are constructed from piezoelectric materials, such as lead zirconate titanate (PZT). Another type of ultrasound transducer that has been developed for various applications including ultrasound imaging is the capacitive micromachined ultrasonic transducer (CMUT). Similar to a PZT transducer, a CMUT transducer may be activated by electrical pulses to generate acoustic signals that propagate in tissues; however, unlike a PZT transducer, a CMUT transducer may employ an additional bias voltage, such as when transmitting and/or receiving ultrasound signals. Traditionally, the bias voltage may be a DC voltage that remains constant during imaging operations.

Furthermore, CMUTs may be arranged in arrays. For example, a 1D transducer array may include multiple CMUT elements arranged in only one dimension, e.g., the azimuth dimension. This arrangement of elements allows the formation of focused beams for improved imaging resolution. In addition, for beams formed by the received signals, the focal depth may be shifted dynamically during imaging for a more uniform resolution. In another dimension, i.e., the elevation dimension, however, the focus of a 1D transducer array is fixed. Because of the fixed focal length, the elevation slice thickness may not be uniform with depth and the imaging performance of the 1D transducer array may be compromised.

One solution to this problem is to use a 1.5D transducer array. For example, a 1.5D transducer array may include at least two rows of elements separated in the elevation dimension. The spacing between the two adjacent rows may be much larger than the wavelength. Further, the number of rows may increase with penetration depth for optimal imaging performance from near field to far field. Further, the number of elements of 1.5D arrays is usually significantly larger than the number of channels of the respective imaging systems. Therefore, high voltage analog switches may be used for selecting desired elements in 1.5D arrays for transmission and/or reception.

SUMMARY

Some implementations herein include techniques and arrangements for operating a CMUT array. In some examples, the CMUT array may include a plurality of CMUT elements arranged in a plurality of rows, each row including multiple CMUT elements. A bias voltage supply may be connected for supplying bias voltages to a first row, a second row, and a third row of the plurality of rows. In addition, a processor may be configured by executable instructions to control the bias voltages by applying a first bias voltage to the second row, and a second, different bias voltage to the first and third rows to configure the CMUT elements of the second row to at least one of transmit or receive ultrasonic energy with different efficiency and/or sensitivity than the CMUT elements of the first row and the third row.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2A illustrates an example structure of a CMUT array according to some implementations.

FIG. 2B illustrates an example cross-sectional view of a structure of a CMUT element according to some implementations.

FIG. 8 is a flow diagram illustrating an example process for determining an image by transmitting and receiving ultrasound energy according to some implementations.

DETAILED DESCRIPTION

Figure 1:
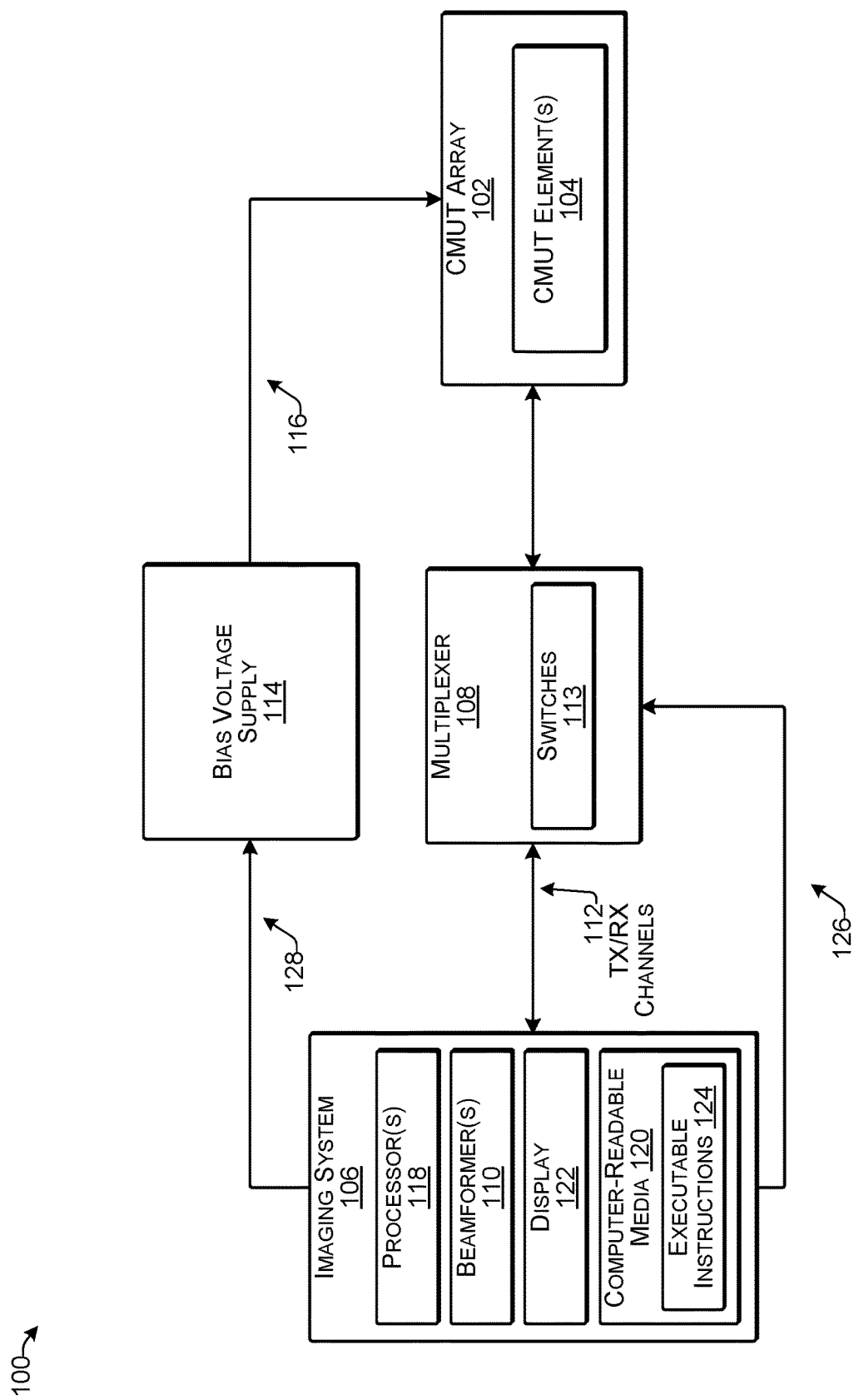
FIG. 1 illustrates an example configuration of an ultrasound system including one or more CMUTS according to some implementations.

Some implementations herein include techniques and arrangements for capacitive micromachined ultrasonic transducers (CMUTs) able to be used for various applications including ultrasound imaging. For example, many applications of ultrasound imaging, including synthetic aperture imaging, use switches to select various apertures of a transducer. Implementations herein provide an alternative technique by controlling a bias voltage applied on the selected CMUT elements in the aperture. Furthermore, as it may not be possible to completely turn off the bias voltage for performing synthetic aperture imaging, in some cases herein, signals are acquired at a plurality of different bias voltage levels, which allows separation of the contributions of individual CMUT elements to the common signal. The separated signals can then be recombined to achieve a reconstruction of a retrospective transmit focus and/or dynamic receive focus. In addition, the separated signals may be recombined with different depth dependent weightings to achieve depth dependent apodization and constant f-number.

In some examples herein, an ultrasound image may be created by an echo ranging technique where acoustic pulses are sent into a medium and their reflections are converted to electrical signals by the transducer. The time it takes for the acoustic pulses to travel the distance between the transducer and the reflecting structure determines the depth at which the reflecting structure is located. In addition, in order to locate the structure in the orthogonal directions the ultrasound energy may be confined in a narrow space forming a beam that can be used to scan the medium in a back and forth manner, much like a searchlight. The strength of the electrical signal corresponding to a particular direction and a particular depth is used to modulate the brightness of a pixel on a display screen. The combination of all the pixels forms the ultrasound image. The shorter the pulse and the narrower the beam, the higher the ability of the ultrasound system to resolve details.

Examples herein include an ability of the system to resolve details by making the beam narrower. For instance, in the ultrasound system herein, the ultrasound beam may be created by arrays of transducer elements. As one example, the beam may be created by applying electric pulses to the CMUT elements with slightly different timing for the pulses applied to each different CMUT element. The timing control may be achieved through the use of a beamformer that contains analog or digital delay components. In addition to controlling the signal timing, the strength of the signal at each CMUT element may be adjusted to improve beam features such as for minimizing sidelobes that reduce image contrast. The set of CMUT elements that are excited by electric signals to create the acoustic beam is referred to herein as an aperture. The entire array or a subset of the CMUT elements may be used as the aperture for a single beam. In a technique referred to herein as "synthetic aperture", the aperture can be further subdivided into smaller subsets and each smaller subset may be used to create a partial beam. The received signals from the partial beams may then be used to recreate the full beam by recombining the received signal with appropriate delays and weightings. For a matrix array the aperture subsets can consist of an entire column and/or row or subsets of a row and/or column or multiple rows and/or columns.

A CMUT herein, such as an element of a CMUT array, may include at least two electrodes arranged proximate to each other with a transducing space between them. One of the two electrodes is moveable toward and away from the other to perform the energy conversion between acoustic energy and electrical energy. The movement of the electrode couples the acoustic energy with an adjacent medium. In some examples herein, the transducing efficiency of the respective CMUTs may be at least partially based on the bias voltage applied between the two electrodes and, accordingly, implementations herein may use the bias voltage to control the transducing efficiency.

In addition, a CMUT array according to some implementations herein may have more than one row of elements in an elevation dimension, such as is the case for 1.25D, 1.5D, 1.75D, and 2D CMUT transducer arrays. For instance, in the examples herein, a 1.5D array may include a CMUT array that has more than one row in the elevation dimension, with the CMUT elements in some of the rows being electrically connected to CMUT elements in others of the rows by a first electrode and electrically connected to CMUT elements in the same row by a second electrode.

Some implementations herein are applicable to CMUT arrays able to be used for ultrasound imaging, such as for medical imaging applications. As one example, a disclosed CMUT array having multiple rows may be used for a wide range of clinical applications by providing variable elevation aperture size, apodization profile, reception dynamic beamforming, and synthetic aperture. For instance, a variable apodization profile may be achieved by varying the bias voltage applied to individual CMUT elements of the CMUT array. In some examples, the CMUTs herein may be incorporated into an ultrasound probe able to be used for ultrasound imaging applications.

The transduction efficiency is a useful performance parameter for a CMUT. The transduction efficiency is, at least partially, determined by the bias voltage applied. A CMUT can be used to transmit (TX) acoustic power into a medium, or to receive (RX) an acoustic signal from the medium, or both. For transmission, the transduction efficiency may be defined as the ratio of the output acoustical energy to the input electrical energy in one cycle. The higher this ratio, the more efficiently the transducer converts the electrical energy into mechanical energy. For the receive mode the transduction efficiency is defined as the ratio of electrical energy received to the input acoustical energy of the acoustic wave impinging on the transducer in one cycle. Efficiency is a unitless quantity, often expressed as a percentage.

A related quantity that also may characterize transducers is sensitivity. For transmission, sensitivity may be expressed as the ratio of the pressure produced by the transducer to the voltage applied, and sensitivity may be measured in Pascals per volt (Pa/V). For receive sensitivity, the definitions and units are the reciprocals of the transmit sensitivity. Transmit and receive sensitivity are often expressed together as loop sensitivity. Loop sensitivity is the ratio of the output voltage to the input voltage when the transducer is used to transmit and receive an acoustic pulse reflected by an acoustic reflector. Loop sensitivity may be expressed in dB. Furthermore, in implementations herein, "transduction efficiency" may include the CMUT transmission and/or receive efficiency, transmission and/or receive sensitivity, or loop sensitivity. For example, both the efficiency and the sensitivity may be determined by the electric field intensity within the transducer (e.g., the electric field intensity in a gap between the two electrodes of a CMUT that includes a CMUT cavity). The electric field intensity may be expressed as the force exerted by the electric field on a unit of positive charge, and may be measured in volts per meter (V/m). A higher electric field intensity results in higher efficiency and higher sensitivity. The electric field intensity herein may be controlled or otherwise determined, at least partially, by controlling the bias voltage. For example, for a given applied voltage, such as a bias voltage, the electric field intensity in the transducing space may be determined at least partially by the cavity dimensions (e.g., depth, shape, profile, etc.) of the CMUT cavity between the CMUT electrodes.

An apodization profile is a window function that weights signals more in the center of an array and less toward both edges. In ultrasound imaging, apodization may be utilized to shape ultrasound beam patterns and reduce side lobe levels for obtaining a better image quality. For instance, in implementations herein, a region at the center of an array may be controlled to have more acoustic output intensity than the regions near the edges of the array, which may generate acoustic fields with minimum side lobes.

Furthermore, in implementations herein, transducing efficiency may include the CMUT transmission efficiency, reception sensitivity, or both (i.e., loop sensitivity). For example, both the transmission efficiency and the reception sensitivity may be determined by the electric field intensity within the transducing space (i.e., the gap between two electrodes of a CMUT including the CMUT cavity). A higher electric field intensity results in a higher transmission efficiency and a higher receiving sensitivity. For a given cavity geometry (e.g., depth, shape, profile, etc.), the electric field intensity in the transducing space may be determined by the applied bias voltage. The frequency response (e.g., center frequency, bandwidth, etc.) of the CMUTs herein may be at least partially determined by the mechanical properties (e.g., the resonant frequencies) of the CMUT structure and the medium. For example, for a CMUT with a vibrating membrane, the center frequency of the CMUT is at least partially determined by the resonant frequency (especially first resonant frequency) of the membrane and the loading of the medium. Further, by using the bias voltage to alter the mechanical properties of the CMUT structures (e.g., change the boundary condition), the bias voltage may be used to control the frequency response of the CMUT.

For discussion purposes, some example implementations are described in the environment of ultrasound imaging. However, implementations herein are not limited to the particular examples provided, and may be extended to other applications, other systems, other environments for use, other array configurations, and so forth, as will be apparent to those of skill in the art in light of the disclosure herein.

FIG. 1 illustrates an example configuration of an ultrasound system 100 including CMUT array according to some implementations. In this example, the system 100 includes a CMUT array 102. In some cases, the CMUT array 102 may be a 1.5D CMUT array having a plurality of CMUT elements 104 in more than two rows in the elevation dimension, as discussed additionally below. The system 100 further includes an imaging system 106 and a multiplexer 108 in communication with the CMUT array 102. In some examples, the system 100 may include, or may be included in, an ultrasound probe for performing ultrasound imaging.

The imaging system 106 may include one or more beamformers 110. The beamformer(s) 110 can be implemented by either software, hardware, or a combination thereof. As one example, the imaging system 106 may have a first beamformer 110 for transmit and a separate second beamformer 110 for receive. The transmit beamformer may impart a different time delay to the electric pulse of each channel. The receive beamformer may combine signals from multiple input channels to form a single output while imparting a different time delay to the signal of each channel. The beamformer(s) 110 may include multiple transmit and/or receive (TX/RX) channels 112. As one example, the imaging system 106 may include 128 transmit and receive channels 112 that communicate with the multiplexer 108. In some instances, the multiplexer 108 may include a large number of switches 113, which may be high voltage analog switches in some cases. Further, a bias voltage supply 114 may generate multiple levels of bias voltages for individual groups of CMUT elements, as indicated at 116. Several examples of bias voltage supplies are described in U.S. patent application Ser. No. 15/212,326, filed Jul. 18, 2016, which is incorporated herein by reference.

The imaging system 106 may include one or more processors 118, one or more computer-readable media 120, and a display 122. For example, the processor(s) 118 may be implemented as one or more physical microprocessors, microcontrollers, digital signal processors, logic circuits, and/or other devices that manipulate signals based on operational instructions. The computer-readable medium 120 may be a tangible non-transitory computer storage medium and may include volatile and nonvolatile memory, computer storage devices, and/or removable and non-removable media implemented in any type of technology for storage of information such as signals received from the CMUT array 102 and/or processor-executable instructions, data structures, program modules, or other data. Further, when mentioned herein, non-transitory computer-readable media exclude media such as energy, carrier signals, electromagnetic waves, and signals per se.

In some examples, the imaging system 106 may include, or may be connectable to a display 122 and/or various other input and/or output (I/O) components such as for visualizing the signals received by the CMUT array 102. The computer-readable media 120 may store executable instructions 124 that may be executed by the processor(s) 118 to cause the imaging system to perform the functions described herein. For example, the imaging system 106 may communicate directly with the multiplexer 108, such as for controlling the plurality of switches 113 therein, as indicated at 126, and may communicate with the bias voltage supply 114, as indicated at 128, such as for controlling the bias voltage supplied to the CMUT array 102.

FIG. 2A illustrates a plan view of an example configuration of a CMUT array 102 according to some implementations. In some examples, the CMUT array 102 may be a 1.5D CMUT array with multiple rows in elevation direction. As illustrated, the CMUT array 102 includes a plurality of elements 104. The elements 104 can be arranged in different ways and have different shapes. In some examples, the size of the elements 104 may not be all the same. In other examples, the elements 104 may be generally the same in size, shape, and physical configuration. In this example, the elements 104 are arranged in at least three rows 202, namely a first row 202(1), a second row 202(2) and a third row 202(3). The elements 104 may be mounted on or otherwise attached to a substrate 206. Furthermore, the elements 104 are also arranged in a plurality of columns, e.g., 204(1), 204(2), 204(3), 204(4), . . . , 204(N−1), 204(N). FIG. 2A further indicates the elevation direction 208 for the CMUT array 102, and the azimuth direction 210.

FIG. 2B illustrates an example cross-sectional view of a representative one of the CMUT elements 104 as viewed along line 2B-2B of FIG. 2A according to some implementations. In this example, a plurality of CMUT cells 210 are formed on a substrate 212. The CMUT cells 210 include an upper or first electrode 214, and a lower or second electrode 216, separated by a cavity 220. In some examples, the substrate 212 may be formed of a conductive material and may serve as the second electrode 216 for the CMUT cells 210. In other examples, such as in the case that the substrate 212 is formed of a nonconductive material, a layer of conductive material may be deposited onto an upper surface of the substrate 212 to serve as the second electrode 216, such as prior to deposition of an optional insulation layer 222, which may be disposed on an upper surface of the substrate 212. In some case, the substrate 212 may be bonded or otherwise attached to the substrate 206 (e.g., an IC wafer/chip, PCB board, glass wafer/chip, etc.) discussed above with respect to FIG. 2A, while in other cases, the substrate 206 may be the same substrate as the substrate 212.

An elastic membrane 224 may be disposed over the substrate 212 and may be supported by a plurality of sidewalls 226 to provide a plurality of the cavities 220 corresponding to individual CMUT cells 210, respectively, e.g., one cavity 220 per CMUT cell 210. In the illustrated example, the membrane 224 may have a uniform thickness over the cavities 220; however, in other examples, the thickness or other properties of the membrane 224 may vary, which may vary the frequency and/or other properties of the CMUT cells 210. The membrane 224 may be made of single layer or multiple layers, and at least one layer may be of a conductive material to enable the membrane 224 to serve as the first electrode 214.

The membrane 224 may be made of an elastic material to enable the membrane 224 to move toward and away from the substrate 212 within a transducing gap 228 provided by the cavities 220. For example, the membrane 224, as the first electrode 102, may be deformed during transmission (TX) by applying an AC voltage between the first electrode 102 and the second electrode 109, or may be deformed during reception (RX) by an impinging ultrasound wave. Thus, the membrane 224 is able to move back and forth within the transducing gap 228 formed by the cavities 220 in response to an electrical signal when producing ultrasonic energy (TX) or in response to receiving ultrasonic energy (RX). Factors that can affect the resonant frequency of the CMUT cells 210 include the length and width of the respective cavities 220, which correspond to the membrane area over each cavity, and membrane stiffness, which may at least partially correspond to the membrane thickness over each cavity 220 and membrane material.

The moveable portion the membrane 224 disposed over each cavity 220 has an area that, along with the stiffness of the membrane 224, at least partially determines the resonant frequency of the individual CMUT cells 210. For instance, a CMUT cell 210 having a smaller membrane area may have a higher resonant frequency than a CMUT cell 210 having a larger membrane area, assuming that the membrane thickness and other variables are constant for both CMUT cells 210. Accordingly, by changing the dimensions of the cavities (and thereby the membrane areas), e.g., when viewed in plan, the resonant frequencies of the respective CMUT cells 210 may vary. Further, the CMUT cells may be constructed in any desired shape and are not limited to the examples illustrated herein.

Alternatively, in some examples, the thickness of the membrane 224 is not uniform over the cavities 220. For instance, instead of changing the dimensions of the cavities 220 and the area of the membrane 224, the membrane thickness profile may be different over different CMUT cells 210. For example, forming successively thinner membrane thicknesses or more flexible membranes over CMUT cells, such as toward the edges may also be used to control the frequency profile. Furthermore, by applying a bias voltage to the CMUT cells 210, an initial load may be placed on the membrane 224, which may change the resonant frequency of the respective CMUT cells 210.

Referring back to FIG. 2A, the elements 104 are arranged in three rows 202(1)-202(3). There are different configurations of electrical connections possible for the three rows and the elements 104 within the rows 202. As one example, one of the electrodes 214 or 216 of the elements 104 may be electrically connected to the electrodes 214 or 216, respectively, of other elements in the same column 204, while the other one of the electrodes 214 or 216 may be connected to other elements in the same row 202. For instance, as indicated at 230, the first electrodes 214 or the second electrodes 216 from one element 104 in the same column 204(3) in each of the three rows 202(1)-202(3) may be electrically connected so that the three elements in the column 204(3) are electrically connected. A transmission signal may be delivered concurrently through the three electrically connected elements 104 in the same column 204(3). Similarly, reflected ultrasonic energy may be received concurrently through the three electrically connected elements 104 in the same column 204(3). Furthermore, the other one of the first electrode 214 or the second electrode 216 of each element may be electrically connected with the other electrodes 214 or 216 respectively of the other elements 104 in the same row 202. As one example, the first electrode 214 may be electrically connected to the other first electrodes 214 of other elements 104 in the same column 204, while the second electrode 216 may be electrically connected to the other second electrodes 216 of other elements 104 in the same row. Alternatively, the second electrode 216 may be electrically connected to the other second electrodes 216 of other elements 104 in the same column 204, while the first electrode 214 may be electrically connected to the other first electrodes 214 of other elements 104 in the same row 202.

The bias voltage may be applied to the common row electrode 214 or 216, and therefore may be shared among the elements of the same respective row 202. This configuration, through variation of the bias voltage level, allows the transmit efficiency to vary among the elements 104 of different rows 202, and therefore allows the energy imparted to the acoustic wave to vary among the elements 104 of different rows, even though the transmit voltage applied may be common. Similarly, the sensitivity of the elements 104, and therefore the energy of the received electrical signal, can vary between elements of different rows based on the variation in the bias voltage applied to the different rows 202.

In the ultrasound imaging performed herein, signals from the elements 104 in an aperture may be combined by beamforming to create an image. In the beamforming process herein, the signals from the elements 104 may be summed together with delays that correspond to the time of flight of the ultrasound wave from a particular point in space to each element 104. For a fixed delay, the beamforming process may create a beam with a single focus at some point in the imaged space. An azimuthal resolution may be determined by the width of the beam and which is smallest at the focus. In order to improve resolution uniformity a different delay profile may be applied for each point in the image corresponding to a focus at that point.

If there is a transmit/receive (TX/RX) channel for each element 104, all the data can be acquired in one activation of the CMUT array using dynamic receive beamforming. Alternatively, in the case where there are not enough channels for every element 104, a group of elements can share one TX/RX channel through the use of switches and channel multiplexing. The data for each TX/RX channel can then be derived from multiple transmit/receive activations also referred to as "firings" of the array or a portion of the array, such as where only a single element from the aperture participates in a particular firing. This technique may be referred to as synthetic aperture beamforming and involves combining the signals from separate firing events. In electrostatic transducers where the bias determines the sensitivity of the transducer, the opportunity arises to select and deselect the active element within an aperture by turning the bias on and off.

In implementations herein, it is typically not desirable to set the bias voltage to zero and instead, the bias voltage may be set to a predetermined non-zero value while at the same time a high voltage transmit pulse may be applied to the CMUT array 102. For instance, in the array 102, three elements 104 in each same column 204 may share the same transmit/receive channel. Accordingly, the elements in the different rows are not switched off completely in the examples herein; however, by controlling the bias voltage applied to one or more rows, synthetic aperture can still be achieved. As discussed additionally below, the individual contributions of the elements 104 to the overall signal can be extracted based on the differences between signals acquired with different bias voltage levels. Accordingly, by applying different bias voltages to different rows 202 at different times, implementations herein are able to achieve synthetic aperture control.

Figure 3:
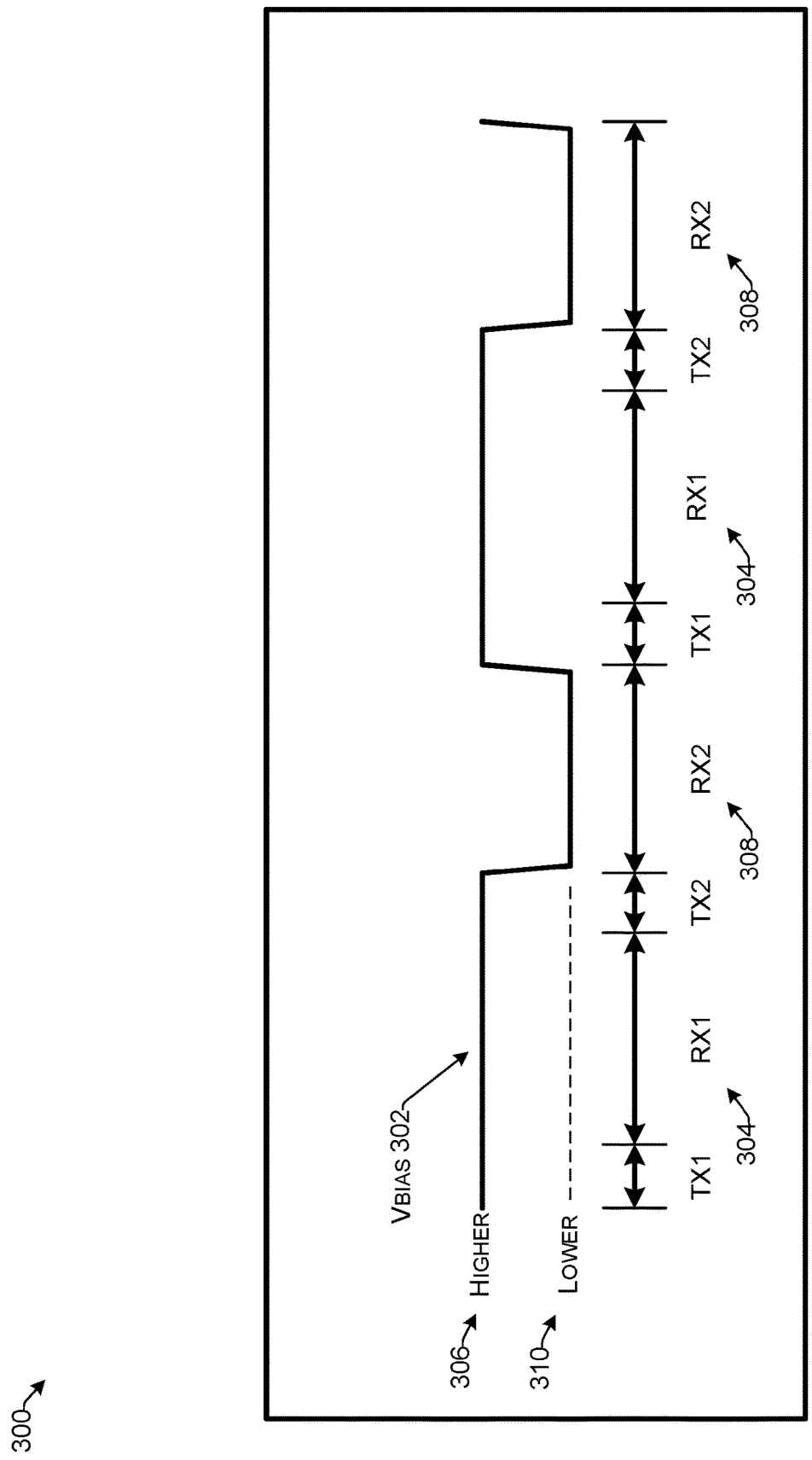
FIG. 3 is an example graph illustrating that the bias voltage may vary from one firing to the next according to some implementations.

FIG. 3 is an example graph 300 illustrating variation of the bias voltage between firings according to some implementations. The graph 300 may correspond to an example time evolution of a bias voltage 302 on the outer two rows of elements of a 1.5D CMUT transducer, e.g., rows 202(1) and 202(3) of FIG. 2A discussed above. The sequence of firings may include two distinct activations designated as the first firing and the second firing. Each firing consists of a transmit portion (TX) and a receive portion (RX). The outer two rows 202(1) and 202(3) of FIG. 2A may share the same bias voltage level, which may be independent from a bias voltage level applied to the center row 202(2). All three elements in each column 204 in FIG. 2A may i.e., (center and the two outer elements) may share the same transmit/receive channel and with respect to the transmitter/receiver signal path to which they are considered electrically connected. Thus, only the sum of the signals generated by each element can be sensed.

For a first firing TX1 and RX1, during the transmit (TX1) and reception portion (RX1) of the firing, as indicated at 304, the bias voltage is set to the higher level 306 for all rows 202. For the second firing, during the transmit portion TX2 the bias voltage remains at the higher level 306; however, as indicated at 308, during the reception portion (RX2) of the second firing, the bias voltage for the outer rows is set to the lower level 310. This sequence of firings may be repeated for the entire scan.

Figure 4:
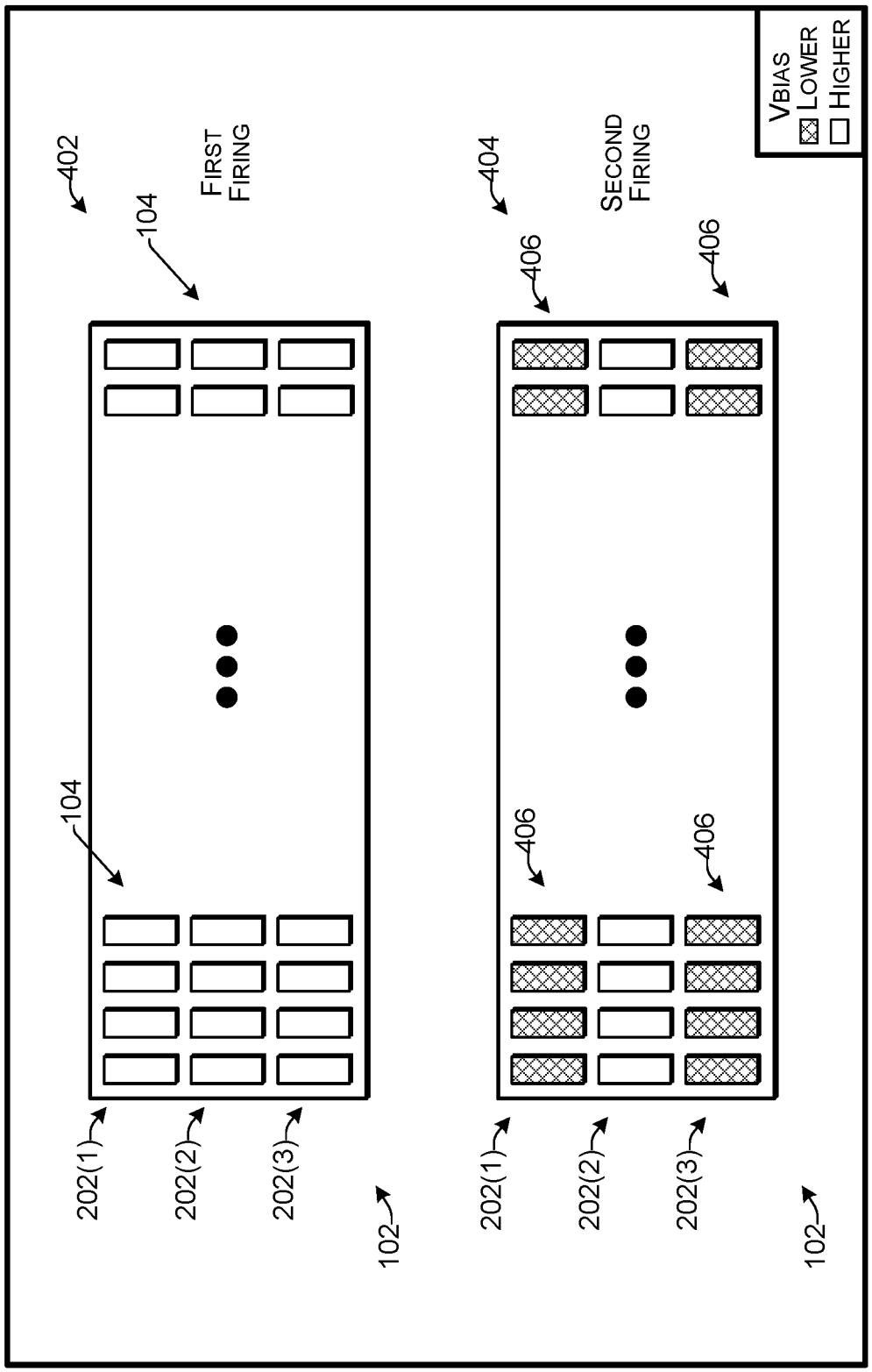
FIG. 4 illustrates an example of switching bias voltage patterns for elements of a CMUT array during reception according to some implementations.

FIG. 4 illustrates an example of switching bias voltage patterns for elements during reception for a CMUT array 102 according to some implementations. This example illustrates a bias voltage configuration for two consecutive firings. During a first firing 402, the bias voltage applied to the elements 104 of the array 102 may be at a first voltage level and may be applied to all of the elements 104 in all of the rows 202. During a second firing 404, the bias voltage applied to some of the elements is changed so that the bias voltage applied to the outer elements in rows 202(1) and 202(3), as indicated by crosshatching at 406, is lower than the bias voltage applied to the center elements in row 202(2) during the receive interval of the second firing. Thus, during the second firing 404, bias voltage applied to the center row 202(2) may be at the first voltage level, and the bias voltage applied to the outer rows 202(1) and 202(3) may be a lower second voltage level that is lower than the first voltage level.

The contributions of the elements of the outer rows can be separated during signal processing by rescaling the difference of the received signals from the two firings 402 and 404 based on a relationship expressed by the following equation:

$$s_o = f(V_{DC1}, V_{DC2})(v_1 - v_2) \quad \text{(EQ1)}$$

where $s_o$ is the contribution to the signal from the outer elements during the first firing, $v_1$ and $v_2$ are the signals received from the first and second firings respectively, $v_{DC1}$ is the higher first bias voltage level and $v_{DC2}$ is the lower second bias voltage level applied to the elements of the outer rows 202(1) and 202(3).

Equation (EQ1) may be based on an assumption that the change of bias voltage affects only the sensitivity of the CMUT and the waveforms are simply related by a rescaling between different bias levels. This is considered a reasonable assumption for the received signals since the non-linear behavior of the CMUT may not be significant when the signals are small. The precise form of the function $f(\bullet)$ may be determined experimentally.

In some examples herein, one possible functional form for the resealing factor may be expressed by the following equation:

$$S_O = r \frac{v_2 - v_1}{1 - r} \quad \text{(EQ2)}$$

where r is determined by finding experimentally the parameters c, γ in the following equation:

$$r = c \left( \frac{V_{DC1}}{V_{DC2}} \right)^\gamma. \quad \text{(EQ3)}$$

where $V_{DC1}$ and $V_{DC2}$ are the bias voltages on the outer elements during the first and second receive events, respectively. In this example the bias voltage during the transmit portions of the transmit/receive intervals may remain the same, e.g., the higher bias voltage level $V_{DC1}$, as discussed above with respect to FIG. 3.

Based on the above equations, the contribution of the outer elements may be determined as the difference of the received signal during the two transmit/receive firing events appropriately scaled. Further, the contributions of the outer elements during the second firing may be estimated and used in the beamforming sum. The contribution of the center elements may also be estimated by subtracting the estimate of the outer elements from the combined signal, e.g., as in the following equation:

$$s_c = v_1 - s_o \quad \text{(EQ4)}$$

The signal data obtained from each firing may be stored in memory or other computer-readable medium. The processor 118 of the imaging system 106 discussed above with respect to FIG. 1 may execute the executable instructions 124 to perform operations to estimate the contributions of each element based on equations (EQ2) and (EQ3) set forth above. After the contributions of each element have been estimated, the contributions may be combined to generate a synthetic aperture in the elevation dimension, as discussed below.

For the synthetic aperture beamforming herein, the individual signals attributed to each element may be summed, weighted (apodization), and delayed to form received beams with the focus of the received beams located at multiple points of the image. The weighting of the individual signals may be used to reduce beam sidelobes and ensure a constant f-number to achieve uniformity of resolution with depth. The ratio of the imaging depth to the aperture size may be referred to as the f-number. In the previous and the following examples, beamforming in the orthogonal direction (azimuthal) may be unaffected as long as the efficiency of all the elements in a row may be assumed to be the same.

The above example may be extended to include multiple different bias voltage levels during transmission as well. For instance, in the above example and as discussed in the example of FIG. 3, the transmitted ultrasound beam has the same elevational aperture and delay profile, i.e., focus, for both the first firing and the second firing. In other examples herein, however, multiple firings may be used so that only one element or sub-group of elements transmits at each firing. This allows creation of a transmit focus retrospectively at any depth of the image. The applied bias voltage level may be used to select which elements are transmitting at each firing.

In this example, controlling the bias voltage level may provide an incomplete switching mechanism and some energy may still be emitted from the deselected CMUT elements. Accordingly, similar to the example discussed above of switching elements for receiving, the signal contributions of each transmitting CMUT element may be estimated using the knowledge of the dependence of sensitivity on the applied bias voltage. Furthermore, switching the bias voltage applied to CMUT elements in transmit and receive may be combined for concurrently creating a retrospective transmit focus and dynamic receive focus.

Figure 5A:
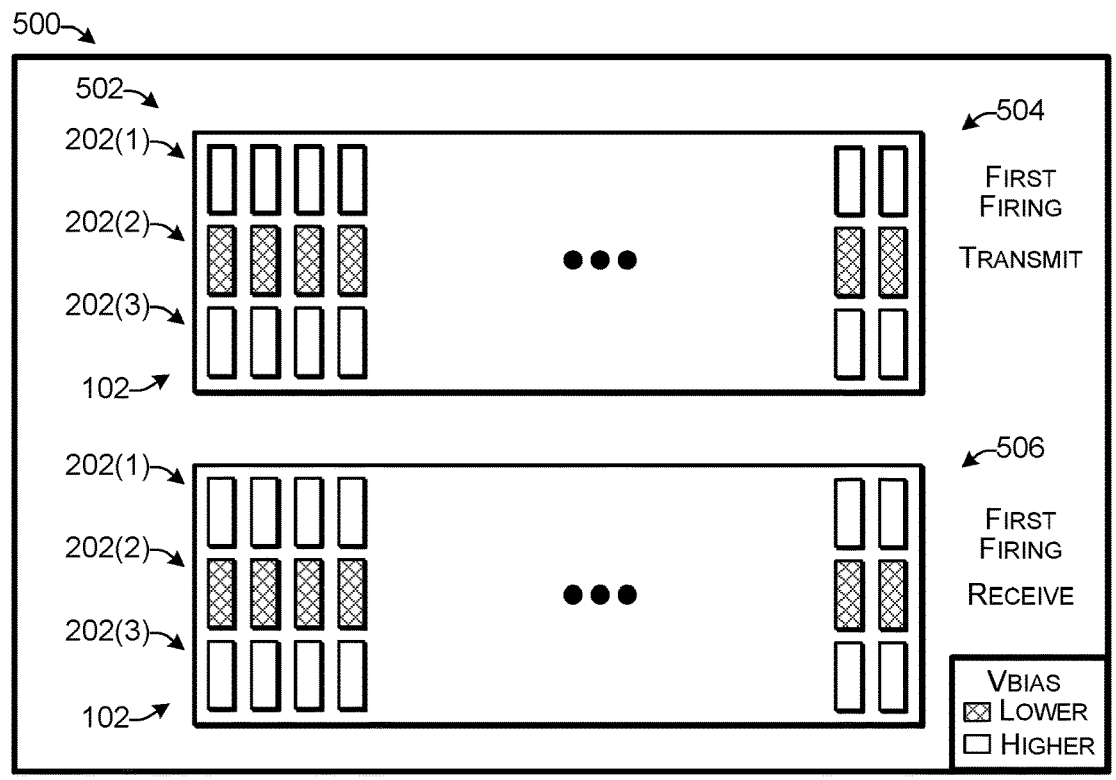
FIG. 5A-5D illustrate examples of switching bias voltage patterns for elements of a CMUT array during transmission and reception according to some implementations.

FIGS. 5A-5D illustrate a bias voltage configuration for an example sequence 500 of four consecutive firings of a CMUT array 102 according to some implementations. In this sequence 500, the order of the firings is immaterial and may be executed in any order. FIG. 5A illustrates a first firing bias voltage condition 502 with a transmit portion 504 and a receive portion 506. The first firing 502 includes transmitting 504 and receiving 506 with the edge rows 202(1) and 202(3) under a higher bias voltage than a lower bias voltage applied to the center row 202(2) during both transmitting and receiving ultrasonic energy.

Figure 5B:
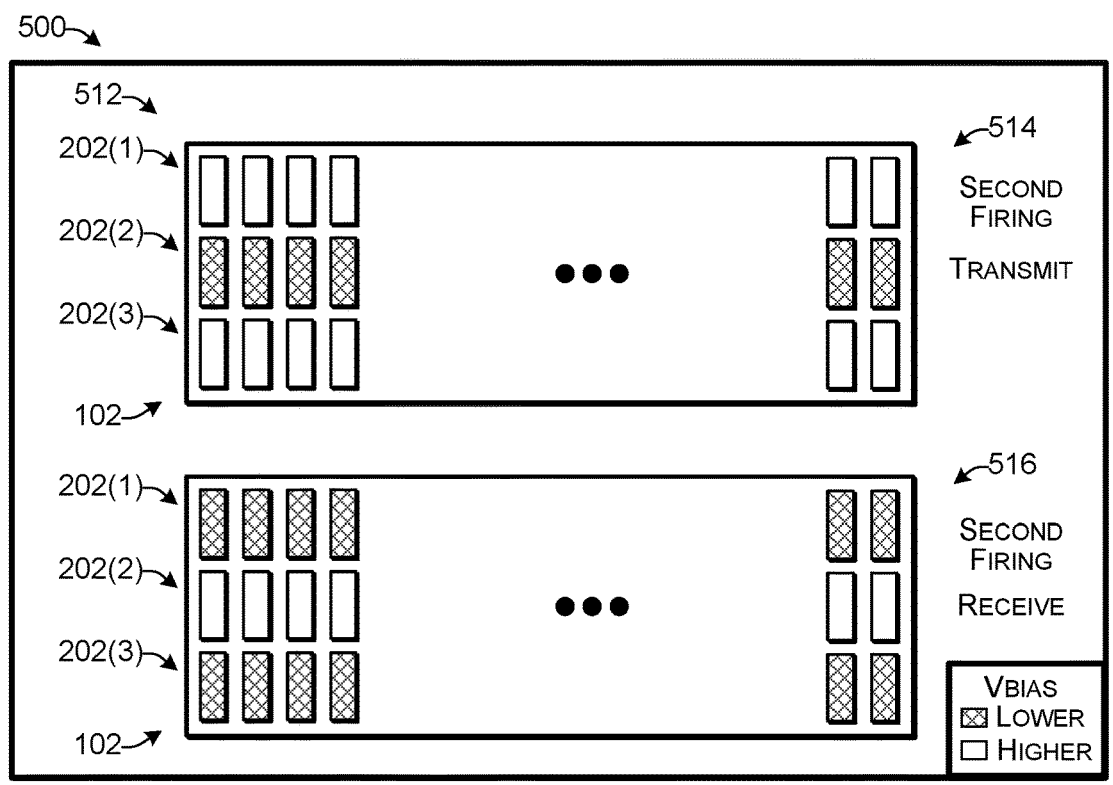

FIG. 5B illustrates a second firing bias voltage condition 512 with a transmit portion 514 and a receive portion 516. The second firing 512 includes transmitting with the edge rows 202(1) and 202(3) under a higher bias voltage than a lower bias voltage applied to the center row 202(2) during the transmitting 514. During receiving 516, the second firing includes receiving 516 with the center row 202(2) under the higher bias voltage and the edge rows 202(1) and 202(3) under the lower bias voltage.

Figure 5C:
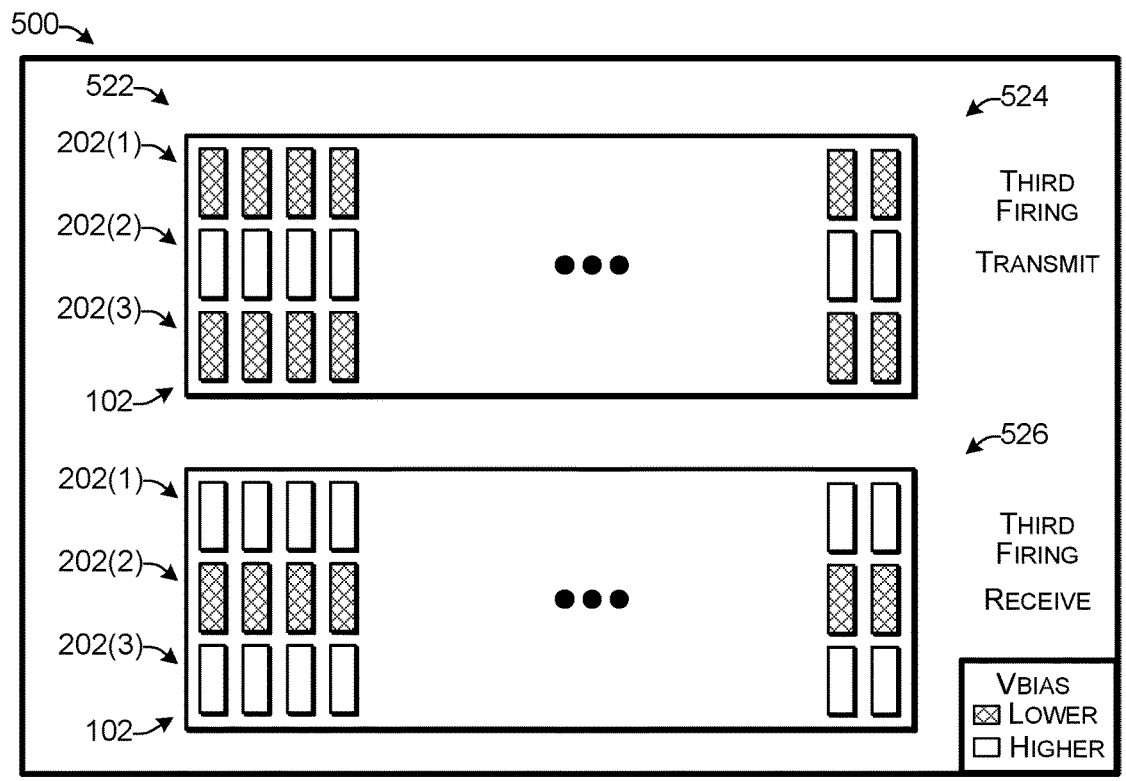

FIG. 5C illustrates a third firing bias voltage condition 522 with a transmit portion 524 and a receive portion 526. The third firing 522 includes transmitting 524 with the edge rows 202(1) and 202(3) under a lower bias voltage than a higher bias voltage applied to the center row 202(2) during the transmitting 524. During receiving 526, the third firing includes receiving 526 with the center row 202(2) under the lower bias voltage and the edge rows 202(1) and 202(3) under the higher bias voltage.

Figure 5D:
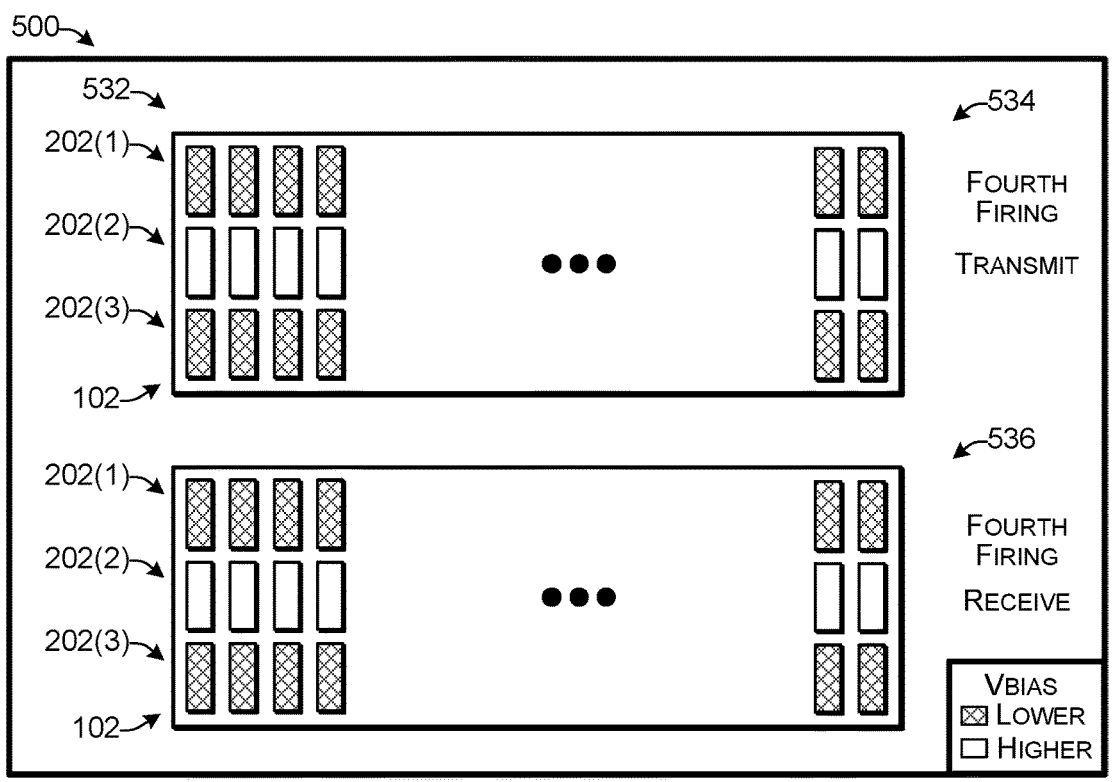

FIG. 5D illustrates a fourth firing bias voltage condition 532 with a transmit portion 534 and a receive portion 536. The fourth firing 532 includes transmitting 534 with the edge rows 202(1) and 202(3) under a lower bias voltage than a higher bias voltage applied to the center row 202(2) during the transmitting 534. During receiving 536, the fourth firing includes receiving 536 with the center row 202(2) under the higher bias voltage and the edge rows 202(1) and 202(3) under the lower bias voltage.

In the sequence 500 of FIGS. 5A-5D, the contributions from each CMUT element may be extracted as discussed above by neglecting nonlinear effects during transmission. For example, in the case where the AC transmission voltage is low compared to the applied bias voltage, the assumptions discussed above may be made about the dependence of element efficiency on the bias voltage for determining the contribution from each element at each portion of each firing. Accordingly, the information about the element efficiency during either the transmit portion or the receive portion may be contained in the following two matrices, where the rows correspond to a firing event and the columns correspond to elements:

$$T = \begin{pmatrix} 1 & t \\ t & 1 \end{pmatrix} \quad (EQ5)$$

and $$R = \begin{pmatrix} 1 & r \\ r & 1 \end{pmatrix} \quad (EQ6)$$

where T is the transmit efficiency, R is the receive efficiency, and t and r are the relative efficiencies of an element at the lower bias voltage with respect to the higher bias voltage during transmit and receive, respectively. In general, r and t may differ. The dependence of t on the bias voltage has the same form as for r given previously equation (EQ3). For example, the first row corresponds to the case where bias voltage is high for the edge element whereas the second row corresponds to the bias voltage being high for the center element. These matrices will be referred to as efficiency matrices.

The signal S received for a particular firing may be the sum of the contributions from all the elements. The combined transmit and receive efficiency matrix W is the outer product of the T and R matrices, as follows:

$$W = T \otimes R \quad (EQ7)$$

The explicit form of the resulting 4×4 matrix for the transmit/receive events is given by the following:

$$W = \begin{pmatrix} 1 & r & t & rt \\ r & 1 & rt & t \\ t & rt & 1 & r \\ rt & t & r & 1 \end{pmatrix} \quad (EQ8)$$

The signal received at each firing can be expressed with the help of the efficiency matrix as the following equation:

$$V = WS \quad (EQ9)$$

where V is a column vector $$V = \begin{pmatrix} v_1 \\ v_2 \\ v_3 \\ v_4 \end{pmatrix}$$

indexed by the firing for which the signal v is acquired. Similarly S is a column vector $$S = \begin{pmatrix} s_1 \\ s_2 \\ s_3 \\ s_4 \end{pmatrix}$$

where the indices signify the transmit/receive element combination as shown in Table 1.

TABLE 1

| Index | Transmit | Receive |
|---|---|---|
| 1 | Edge | Edge |
| 2 | Edge | Center |
| 3 | Center | Edge |
| 4 | Center | Center |

Inverting this matrix will give an estimate of the contribution from each transmit/receive element combination, as follows:

$$W^{-1} = \frac{1}{(1-r^2)(1-t^2)} \begin{pmatrix} 1 & -r & -t & rt \\ -r & 1 & rt & -t \\ -t & rt & 1 & -r \\ rt & -t & -r & 1 \end{pmatrix} \quad (\text{EQ10})$$

Accordingly, the signal S may be expressed as the following equation:

$$S = W^{-1}V \quad (\text{EQ11})$$

For example, the signal received by the edge elements due to the emitted sound by the same edge elements is given by $$S_1 = \frac{v_1 - rv_2 - tv_3 + rtv_4}{(1-r^2)(1-t^2)} \quad (\text{EQ12})$$

Accordingly, by controlling the bias voltages applied to groups of the CMUT elements, and by using the foregoing signal processing techniques, implementations herein are able to control the electric field intensity of various groups of the CMUT elements. This enables control of the shape and amount of the acoustic energy transmitted and control of the sensitivity of the CMUT elements receiving the acoustic energy.

Figure 6:
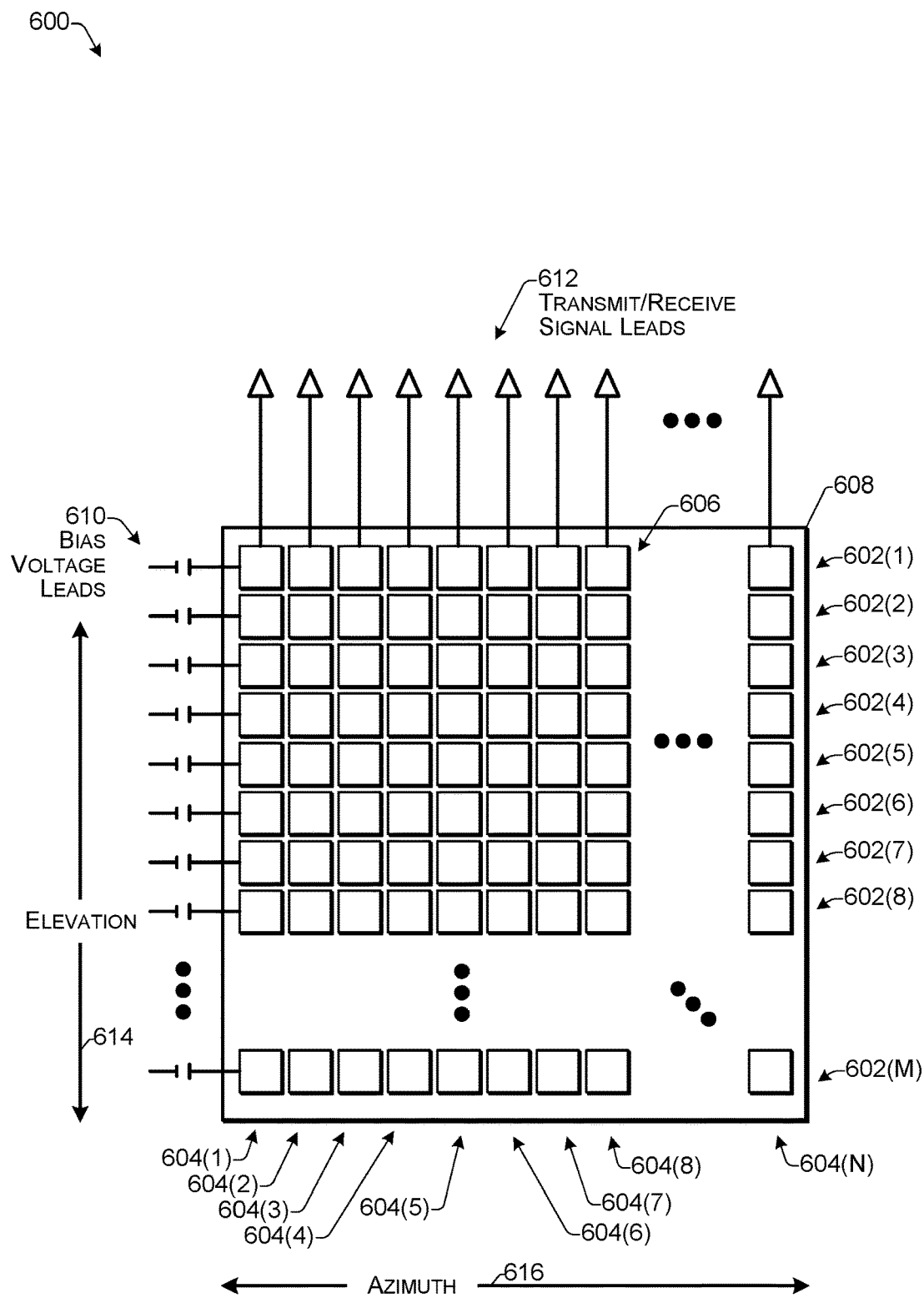
FIG. 6 illustrates a plan view of an example configuration of a CMUT array according to some implementations.

FIG. 6 illustrates a plan view of an example configuration of a CMUT transducer apparatus including a CMUT array 600 according to some implementations. The CMUT array 600 is arranged in a matrix configuration, and includes M rows 602 and N columns 604 (M×N) of CMUT elements 606 where M is the number of rows 602(1)-602(M) and N is the number of columns 604(1)-604(N). The CMUT elements 606 may be disposed on a substrate 608, and may have a construction that is the same or similar to that discussed above with respect to the CMUT elements 104 of FIGS. 1 and 2.

In this example, the CMUT elements 606 in the same row 602 are electrically connected to each other to share the same bias voltage, respectively, as indicated by a plurality of bias voltage leads 610, which may be connected to the bias voltage supply discussed above with respect to FIG. 1. Furthermore, in this example, the CMUT elements 606 in the same column 604 may be electrically connected to each other to share the same transmit/receive signals, respectively, as indicated a plurality of transmit/receive signal leads 612, which may be connected to the channels from the multiplexer discussed above with respect to FIG. 1. FIG. 6 further indicates the elevation direction 614 for the CMUT array 600, and the azimuth direction 616.

As an example of one method for operating the CMUT array 600, the signals from all the elements from a plurality of firings are stored in memory or other computer-readable medium. For each firing of the CMUT array 600, a different pattern of bias voltages may be applied to different rows 610 of the CMUT array 600. In the case where the bias voltage cannot be made zero there will be contributions to the signal from all the CMUT elements 606.

In some examples, a synthetic aperture in the elevation direction 614 may be achieved as described in the following paragraphs. For instance, given M elements in a column 604, M firings may be utilized to enable one CMUT 606 element at a time by applying a higher bias voltage to the enabled CMUT element 606 than to the rest of the CMUT elements 606 in the same respective column 604. The individual contributions of each enabled CMUT element may be estimated using the following equation:

$$S = R^{-1}V \quad (\text{EQ13})$$

where the receive efficiency matrix R is given by, $$R = \begin{pmatrix} 1 & r & r & \ldots & r \\ r & 1 & r & \ldots & r \\ . & . & . & & . \\ . & . & . & & . \\ . & . & . & & . \\ r & r & r & \ldots & 1 \end{pmatrix} \quad (\text{EQ14})$$

and the inverse $R^{-1}$ is calculated to be $$R^{-1} = \frac{1}{(1-r)(1+(M-1)r)} \quad (\text{EQ15})$$

$$\begin{pmatrix} 1+(M-2)r & -r & -r & \ldots & -r \\ -r & 1+(M-2)r & -r & \ldots & -r \\ . & & . & & . \\ . & & & . & . \\ -r & -r & -r & & 1+(M-2)r \end{pmatrix}$$

As another example, there may be more than two different bias voltage levels applied to the different rows 602. In this case, data from a plurality of CMUT elements 606 having different bias voltage levels applied may be acquired from a plurality of firings of the CMUT array 600. The individual element contributions may be extracted by inverting the M×M efficiency matrix from equation (EQ13) above. In particular where $S=[s_1 \ s_2 \ \ldots \ s_M]^T$, and $V=[v_1 \ v_2 \ \ldots \ v_M]^T$, the efficiency matrix R may be given by $$R = \begin{pmatrix} 1 & r_2 & r_3 & \ldots & r_M \\ r_1 & 1 & r_3 & \ldots & r_M \\ . & . & . & & . \\ . & . & . & & . \\ r_1 & r_2 & r_3 & \ldots & 1 \end{pmatrix} \quad (\text{EQ16})$$

where $v_i$ is the received signal during firing i and $s_j$ the signal contribution of the element belonging to elevation row j. Each $r_j$ may be determined by the following equation:

$$r_j = c(V_{Lj}/V_{Hj})^\gamma \quad (\text{EQ17})$$

where $V_{Lj}$ and $V_{Hj}$ are the lower and higher bias voltages, respectively, applied to elevation row j. In this more general case, the lower and higher bias voltage levels may be different for each CMUT element depending on, among other factors, the size and geometry of the CMUT element.

As another variation, the previous receive only scheme for an M×N CMUT array may include additional firings combined with applying a different bias voltage for the transmission portion. From the group of CMUT elements 606 sharing the same system transmit/receive channel (i.e., via the same transmit/receive signal lead 612) only one CMUT element might be configured to be transmitting with a high bias voltage while the others are maintained at the lowest bias voltage. Additionally, only one CMUT element 606 might be configured to receive the acoustic energy during the receive portion of signal acquisition. Similar to the cases discussed above with respect to the 3×N array 102, as many firings as there are combinations of transmit/receive elements may be employed to estimate the contributions of each transmit/receive element combination. The number of rows and columns of the efficiency matrix may be equal to the number of firings required to cover all the transmit/receive element combinations. Accordingly, determining the efficiency matrix for the CMUT array 600 may be a simple extension of the 3×N case discussed above with respect to FIGS. 4 and 5, and may be similarly determined from the outer product of the transmit and receive efficiency matrices.

In some examples, the bias voltage for some firings might be zero. In this case, the previous procedures and formulas are still applicable where some of the efficiency matrix entries will be zero. For instance, in the case where the bias voltage for receiving is zero, there are no contributions to the signal from elements with zero bias, and the matrix may be expressed as the following equation:

$$W^{-1} = \frac{1}{(1-t^2)} \begin{pmatrix} 1 & 0 & -t & 0 \\ 0 & 1 & 0 & -t \\ -t & 0 & 1 & 0 \\ 0 & -t & 0 & 1 \end{pmatrix} \quad (EQ18)$$

If symmetry allows it and steering in elevation is not required the number of firings may be reduced by a factor of 2. If M is an even number, then pairs of CMUT elements may be switched. Each pair may consist of two CMUT elements symmetrically located with respect to each other across the elevation centerline of the array 600. If M is odd then the CMUT elements can still be switched in pairs similarly to the case in which M is even, with the exception of the center row of CMUT elements.

The signals from each of the array firings are stored in memory or other computer-readable medium, and the contributions of each transmit/receive CMUT element or CMUT element pair may be estimated by inverting the efficiency matrix, as discussed above. The efficiency matrix may be a square matrix in which each dimension is equal to the total number of firings. The firings may be at least equal to the total number of CMUT elements or CMUT element pair combinations available. Additionally, more firings over that number may improve the signal-to-noise ratio even though there may be no additional spatial information gained.

Figure 7:
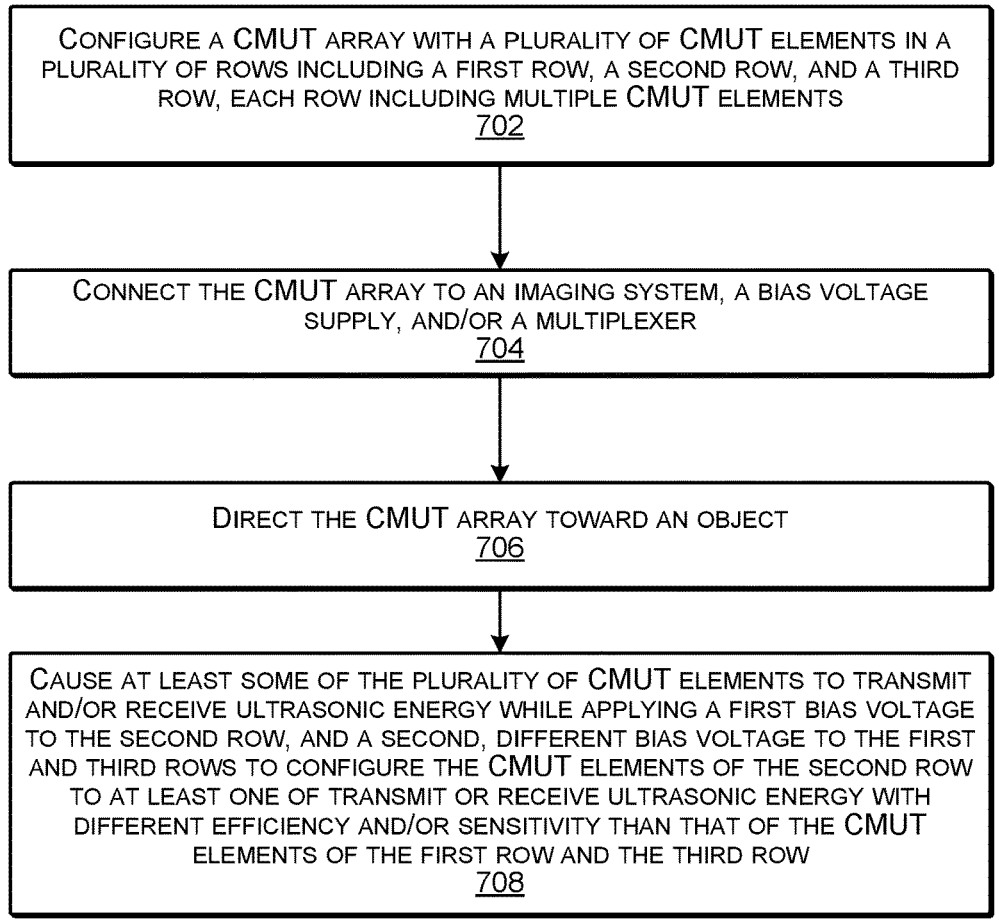
FIG. 7 is a flow diagram illustrating an example process transmitting and receiving ultrasound energy according to some implementations.

FIGS. 7 and 8 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the processes, or alternative processes, and not all of the blocks need be executed. For discussion purposes, the processes are described with reference to the apparatuses, architectures and systems described in the examples herein, although the processes may be implemented in a wide variety of other apparatuses, architectures and systems.

FIG. 7 is a flow diagram illustrating an example process 700 for applying different bias voltages to rows in a CMUT array according to some implementations. The process may be executed, at least in part by a processor programmed or otherwise configured by executable instructions.

At 702, a CMUT array may be configured with a plurality of CMUT elements in a plurality of rows including a first row, a second row, and a third row, each row including multiple CMUT elements.

At 704, the CMUT array may be connected to an imaging system, a bias voltage supply, and/or a multiplexer. In some cases, the CMUT array may be included in a probe that includes or is connected to the imaging system, bias voltage supply, and/or multiplexer.

At 706, the CMUT array may be directed toward an object. For example, for medical imaging, the CMUT array may be directed toward human tissue.

At 708, a processor in the system may cause at least some of the plurality of CMUT elements to transmit and/or receive ultrasonic energy while applying a first bias voltage to the second row, and a second, different bias voltage to the first and third rows to configure the CMUT elements of the second row to at least one of transmit or receive ultrasonic energy with different efficiency than the CMUT elements of the first row and the third row. Accordingly, the processor may cause the plurality of elements to transmit and/or receive ultrasonic energy while applying a first bias voltage to a center row and a second bias voltage to two outer rows. For instance, the first bias voltage may be a higher voltage or a lower voltage than the second bias voltage. The CMUT elements that are affected by the higher bias voltage may transmit and/or receive the ultrasound energy with different sensitivity and/or different electrical intensity than the CMUT elements that are affected by the lower bias voltage. In some cases, the individual contributions provided by the different rows can be computed from different firing sequences for enabling synthetic aperture beamformation in the elevation dimension.

FIG. 8 is a flow diagram illustrating an example process 800 for applying bias voltages to selected elements according to some implementations. The process may be executed, at least in part by a processor programmed or otherwise configured by executable instructions, e.g., as discussed above with respect to FIG. 1.

At 802, a CMUT array may be configured with a plurality of CMUT elements arranged in a plurality of M rows and a plurality of N columns, with the rows having individually controllable bias voltages and the columns being connected to individually controllable transmit and/or receive channels.

At 804, the CMUT array may be connected to an imaging system, bias voltage supply, and/or multiplexer. In some cases, the CMUT array may be included in a probe that includes or is connected to the imaging system, bias voltage supply and/or multiplexer.

At 806, the CMUT array is directed toward an object. For example, for medical imaging, the CMUT array may be directed toward human tissue.

At 808, for multiple ones of the CMUT elements, a processor in the system may cause at least one of the plurality of CMUT elements to transmit and/or receive ultrasonic energy while applying a first bias voltage to one of the rows, and a second, lower bias voltage to at least one other one of the rows.

At 810, the processor may perform signal processing on signals received from the array to determine an estimated contribution of individual ones of the CMUT elements based on an efficiency matrix determined from a plurality of received signal.

At 812, the processor may present an image based on received reflected ultrasound energy. For instance, the CMUT array may receive reflected ultrasonic energy, e.g., the CMUT array may receive ultrasound signals for imaging in addition to transmitting the ultrasound signals, and may present an image on a display based on processing of the received ultrasound signals.

The example processes described herein are only examples of processes provided for discussion purposes. Numerous other variations will be apparent to those of skill in the art in light of the disclosure herein. Further, while the disclosure herein sets forth several examples of suitable systems, architectures and apparatuses for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
    a capacitive micromachined ultrasonic transducer (CMUT) array having a plurality of CMUT elements arranged in a plurality of rows, each row including multiple CMUT elements;
    a bias voltage supply connected for supplying bias voltages to a first row, a second row, and a third row of the plurality of rows; and
    a processor configured by executable instructions to:
        control the bias voltages by applying a first bias voltage to the second row, and a second, different bias voltage to the first and third rows while causing at least a subset of the plurality of CMUT elements to at least one of transmit or receive ultrasonic energy to generate signal data from individual firings of the CMUT elements;
        determine, from the signal data, individual signal contributions of individual CMUT elements of the plurality of CMUT elements for generating an image by:
            determining a combined transmit efficiency and receive efficiency matrix based on the first and second bias voltages, wherein the receive efficiency corresponds to an amount of electrical energy measured compared to an input acoustical energy input to the individual CMUT elements, and the transmit efficiency corresponds to output acoustical energy output by the individual CMUT elements compared to input electrical energy;
            inverting the combined transmit efficiency and receive efficiency matrix to use to determine the individual signal contributions of the individual CMUT elements; and
            generating an image based at least partially on the individual signal contributions determined based on the inverted combined transmit efficiency and receive efficiency matrix.

2. The system as recited in claim 1, wherein the second row is located between the first row and the third row.

3. The system as recited in claim 2, wherein the processor is further configured to alternate the bias voltage for the first row and third row between a high voltage level and a low voltage level for consecutive firings of the CMUT array in a scanning sequence.

4. The system as recited in claim 1, wherein a number of rows and columns of the combined transmit efficiency and receive efficiency matrix is based on a number of possible combinations of transmit and receive CMUT elements.

5. The system as recited in claim 1, further comprising a beamformer, wherein the processor is further configured to cause the beamformer to form focused beams in an elevation dimension of the CMUT array based on the determined individual signal contributions.

6. The system as recited in claim 1, wherein changing the bias voltage applied to the individual CMUT elements changes the receive efficiency and the transmit efficiency of the individual CMUT elements.

7. The system as recited in claim 1, wherein a first CMUT element from the first row, a second CMUT element from the second row, and a third CMUT element from the third row are electrically connected to a same transmit and/or receive channel.

8. The system as recited in claim 1, further comprising:
    a multiplexer in communication with the processor and the plurality of CMUT elements;
    wherein the CMUT elements are configured in a plurality of columns, wherein the processor is further configured to:
    control the multiplexer for causing at least the CMUT elements in a selected column to transmit ultrasonic energy while the first bias voltage is applied to the first row, the second row, and the third row; and
    control the multiplexer for causing the CMUT elements in at least one of the selected column or a different selected column to receive ultrasonic energy while the first bias voltage is applied to the second row and the second bias voltage is applied to the first row and the third row.

9. A method comprising:
applying, by a processor, to a capacitive micromachined ultrasonic transducer (CMUT) array, at least two different bias voltages, the CMUT array having a plurality of CMUT elements arranged in a plurality of rows including at least a first row, a second row, and a third row, wherein the second row is located between the first row and the third row, wherein applying the at least two different bias voltages includes applying a first bias voltage to the second row, and a second, different bias voltage to the first and third rows;
causing, by the processor, while applying the at least two bias voltages, at least one CMUT element from each row to at least one of transmit or receive ultrasonic energy to generate signal data from individual firings of the CMUT elements; and
determining, from the signal data, individual signal contributions of individual CMUT elements of the plurality of CMUT elements for generating an image by:
determining a combined transmit efficiency and receive efficiency matrix based on the first and second bias voltages, wherein the receive efficiency corresponds to an amount of electrical energy measured compared to an input acoustical energy input to the individual CMUT elements, and the transmit efficiency corresponds to output acoustical energy output by the individual CMUT elements compared to input electrical energy;
inverting the combined transmit efficiency and receive efficiency matrix to use to determine the individual signal contributions of the individual CMUT elements; and
generating an image based at least partially on the individual signal contributions determined based on the inverted combined transmit efficiency and receive efficiency matrix.

10. The method as recited in claim 9, wherein applying the at least two different bias voltages configures the CMUT elements of the second row to at least one of transmit or receive ultrasonic energy with different efficiency than the CMUT elements of the first row and the third row.

11. The method as recited in claim 9, further comprising alternating the second bias voltage applied to the first row and third row between a high voltage level and a low voltage level for consecutive firings of the CMUT array in a scanning sequence.

12. The method as recited in claim 9, wherein changing the bias voltage applied to the individual CMUT elements changes the receive efficiency and the transmit efficiency of the individual CMUT elements.

13. The method as recited in claim 9, further comprising causing a beamformer to form focused beams in an elevation dimension of the CMUT array based on the determined individual signal contributions.

14. The method as recited in claim 9, wherein a number of rows and columns of the combined transmit efficiency and receive efficiency matrix is based on a number of possible combinations of transmit and receive CMUT elements.

15. The method as recited in claim 9, wherein the CMUT elements are configured in a plurality of columns, the method further comprising:
causing at least the CMUT elements in a selected column to transmit ultrasonic energy while the first bias voltage is applied to the first row, the second row, and the third row; and
causing the CMUT elements in at least one of the selected column or a different selected column to receive ultrasonic energy while the first bias voltage is applied to the second row and the second bias voltage is applied to the first row and the third row.

16. A system comprising:
a processor;
a bias voltage supply in communication with the processor; and
a capacitive micromachined ultrasonic transducer (CMUT) array including a plurality of CMUT elements arranged in a plurality of rows and a plurality of columns, with the rows having individually controllable bias voltages and the columns being connected to individually controllable transmit and/or receive channels, wherein the processor is configured by executable instructions to:
cause at least some CMUT elements of the plurality of CMUT elements to transmit and/or receive ultrasonic energy while applying a first bias voltage to one of the rows, and a second, lower bias voltage to at least one other one of the rows to generate signal data from individual firings of the CMUT elements; and
determine, from the signal data, individual signal contributions of individual CMUT elements of the plurality of CMUT elements for generating an image by:
determining a combined transmit efficiency and receive efficiency matrix based on the first and second bias voltages, wherein the receive efficiency corresponds to an amount of electrical energy measured compared to an input acoustical energy input to the individual CMUT elements, and the transmit efficiency corresponds to output acoustical energy output by the individual CMUT elements compared to input electrical energy;
inverting the combined transmit efficiency and receive efficiency matrix to use to determine the individual signal contributions of the individual CMUT elements; and
generating an image based at least partially on the individual signal contributions determined based on the inverted combined transmit efficiency and receive efficiency matrix.

17. The system as recited in claim 16, wherein changing the bias voltage applied to the individual CMUT elements changes the receive efficiency and the transmit efficiency of the individual CMUT elements s.

18. The system as recited in claim 16, wherein the processor is configured to cause a beamformer to form focused beams in an elevation dimension of the CMUT array based on the determined individual signal contributions.

19. The system as recited in claim 16, wherein a number of rows and columns of the combined transmit efficiency and receive efficiency matrix is based on a number of possible combinations of transmit and receive CMUT elements.

20. The system as recited in claim 16, further comprising a multiplexer in communication with the processor and the plurality of CMUT elements, wherein the processor is further configured to:
control the multiplexer for causing at least the CMUT elements in a selected column to transmit ultrasonic energy while the first bias voltage is applied to the one of the rows and to the at least one other one of the rows; and
control the multiplexer for causing the CMUT elements in at least one of the selected column or a different selected column to receive ultrasonic energy while the first bias voltage is applied to the one of the rows, and the second, lower bias voltage is applied to the at least one other one of the rows.

\* \* \* \* \*